(12) United States Patent
O'Neill

(10) Patent No.: US 9,959,693 B2
(45) Date of Patent: May 1, 2018

(54) IDENTIFYING DESYNCHRONIZATION BETWEEN REPRESENTATIONS OF DATA OBTAINED FROM AN ORDERED PLURALITY OF DOCUMENTS

(71) Applicant: NCR Corporation, Duluth, GA (US)

(72) Inventor: Darryl O'Neill, Waterloo (CA)

(73) Assignee: NCR Corporation, Atlanta, GA (US)

( * ) Notice: Subject to any disclaimer, the term of this patent is extended or adjusted under 35 U.S.C. 154(b) by 213 days.

(21) Appl. No.: 14/814,655

(22) Filed: Jul. 31, 2015

(65) Prior Publication Data

US 2017/0032605 A1    Feb. 2, 2017

(51) Int. Cl.
| | |
|---|---|
| *G06K 9/00* | (2006.01) |
| *G07D 7/04* | (2016.01) |
| *G07D 7/12* | (2016.01) |
| *G06K 9/62* | (2006.01) |

(52) U.S. Cl.
CPC .............. *G07D 7/04* (2013.01); *G06K 9/6212* (2013.01); *G06K 9/6215* (2013.01); *G07D 7/12* (2013.01)

(58) Field of Classification Search
CPC ......... G07D 7/04; G06K 9/6212; B42D 25/29
USPC .................................................. 382/137–140
See application file for complete search history.

(56) References Cited

U.S. PATENT DOCUMENTS

| | | | | |
|---|---|---|---|---|
| 4,315,246 A | * | 2/1982 | Milford | G06K 9/03 235/449 |
| 7,657,093 B2 | * | 2/2010 | Shizuka | G06K 9/03 382/137 |
| 2005/0286752 A1 | * | 12/2005 | Takiguchi | G06K 9/32 382/139 |
| 2008/0279455 A1 | * | 11/2008 | Wall | G06K 9/186 382/187 |
| 2010/0258629 A1 | * | 10/2010 | Huang | G06K 9/2018 235/449 |
| 2011/0206266 A1 | * | 8/2011 | Faulkner | G06K 9/036 382/139 |

* cited by examiner

*Primary Examiner* — Van D Huynh
(74) *Attorney, Agent, or Firm* — Schwegman, Lundberg & Woessner; Paul W. Martin

(57) ABSTRACT

In a method for identifying desynchronization between representations of data obtained from an ordered plurality of documents, a processor can receive ordered first and second pluralities of data strings obtained from the respective plurality of documents; compare each data string in the first plurality to the corresponding data string in the second plurality and to each data string sequentially before or sequentially after the corresponding data string in the second plurality; based on the comparison, designate each data string in the first plurality as being one of synchronized, leading, or trailing; identify a continuous sequence of N data strings in the first plurality that all have a designation of leading or all have a designation of trailing, where N equals or exceeds a specified sequence threshold; and generate a single error signal that identifies all N of the data strings in the continuous sequence as being desynchronized.

20 Claims, 8 Drawing Sheets

IDENTIFYING DESYNCHRONIZATION BETWEEN REPRESENTATIONS OF DATA OBTAINED FROM AN ORDERED PLURALITY OF DOCUMENTS

BACKGROUND

A document, such as a check, can include a magnetic ink recognition line, often positioned along a bottom edge of the document. The magnetic ink recognition line can be printed with magnetic ink, which can be read magnetically when the magnetic ink recognition line is scanned with a read head in a magnetic scanner. The magnetic ink recognition line can include data corresponding to particular entities and/or quantities associated with the document, such an institution code, an account number, a check number, a check amount, or other suitable data. Reading back data magnetically from the check can be relatively robust, because such magnetic reading can be resistant to stains and conventional ink markings.

SUMMARY

In a method for identifying desynchronization between representations of data obtained from an ordered plurality of documents, a processor can receive ordered first and second pluralities of data strings obtained from the respective plurality of documents; compare each data string in the first plurality to the corresponding data string in the second plurality and to each data string sequentially before or sequentially after the corresponding data string in the second plurality; based on the comparison, designate each data string in the first plurality as being one of synchronized, leading, or trailing; identify a continuous sequence of N data strings in the first plurality that all have a designation of leading or all have a designation of trailing, where N equals or exceeds a specified sequence threshold; and generate a single error signal that identifies all N of the data strings in the continuous sequence as being desynchronized.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various examples discussed in the present document.

DETAILED DESCRIPTION

A terminal can accept checks. An optical scanner in the terminal can produce images of the checks. A processor in the terminal can perform optical character recognition on the images to produce a first plurality of data strings. A magnetic scanner in the terminal, typically separate from the optical scanner, can scan the magnetic ink recognition line from the checks to produce a second plurality of data strings. The processor can compare the first and second pluralities of data strings, to ensure that corresponding data strings in the first and second pluralities correspond to the same check. The processor can compare a data string from one plurality to the corresponding data string from the other plurality, and to each sequentially adjacent data string in the other plurality. In some examples, the process can calculate Levenshtein distances to do the comparisons. In some examples, one plurality can include a continuous sequence of N data strings that match earlier or later data strings in the other plurality. This continuous sequence can indicate that a check entry has been omitted, added, or duplicated, which can desynchronize the first and second pluralities. The processor can generate a single error signal that indicates that all N data strings in the continuous sequence of data strings have been desynchronized. The processor can send the error signal to a server, so that a human operator can manually synchronize the data strings in the continuous sequence, and ensure that the images are sent to the correct account holders.

In some examples, the human operator can perform one synchronization operation that affects all the data strings in the continuous sequence. This represents an improvement over earlier systems, which only compare data strings in one plurality to the corresponding data strings in the other plurality (e.g., without looking at sequentially adjacent strings). In these earlier systems, the human operator can perform synchronization operations for every data string, which, for a group of N data strings, requires N operations. As a result, the present system, which generates a single error signal for N data strings in the continuous sequence rather than N error signals, results in a factor of N improvement in efficiency.

Figure 1:
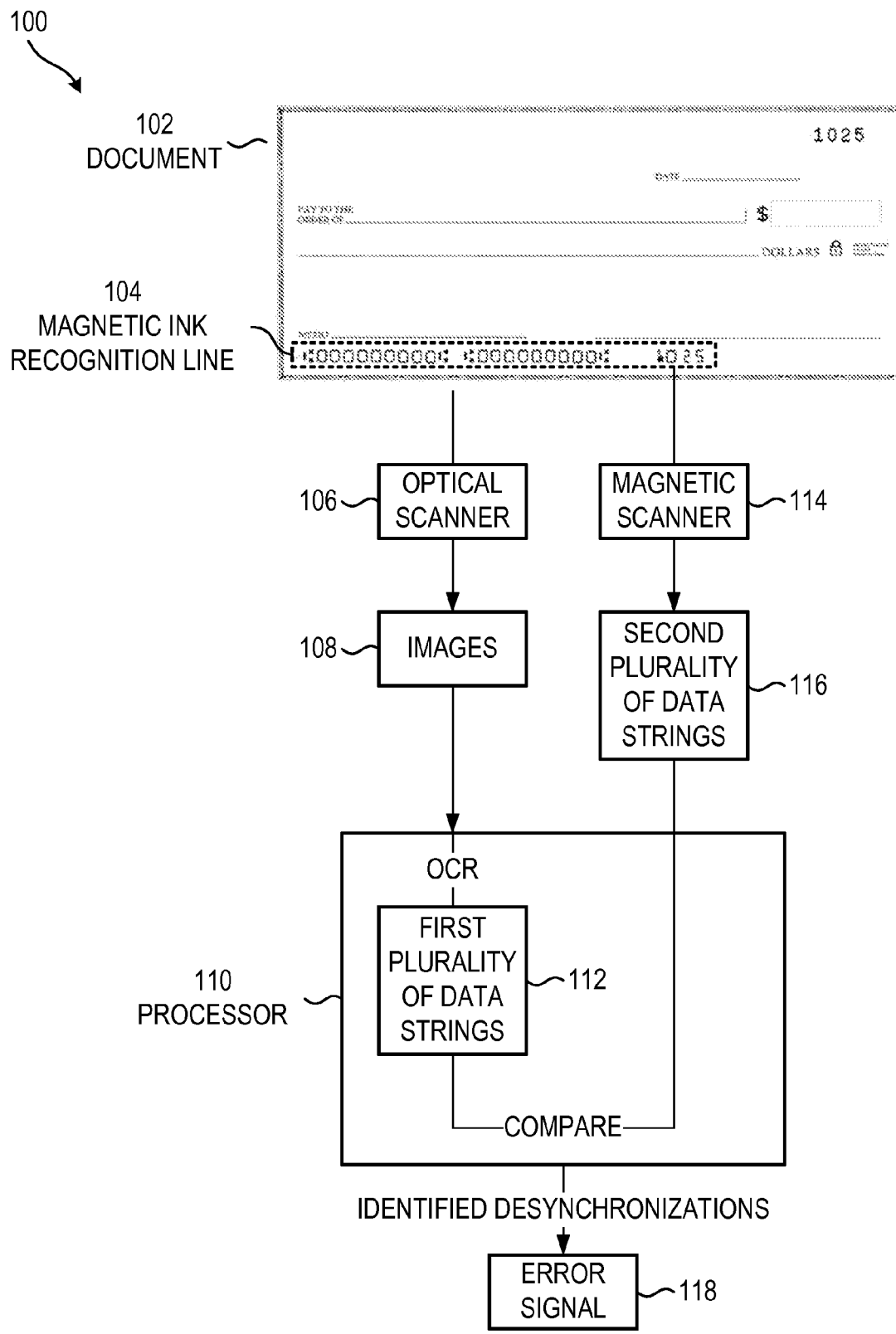
FIG. 1 shows an example of a system, such as a terminal, that can receive documents, such as deposited checks, in accordance with some embodiments.

FIG. 1 shows an example of a system 100, such as a terminal, that can receive documents 102, such as deposited checks, in accordance with some embodiments. Document 102 is not part of the system 100. System 100 is but one example of a system that can receive documents; other suitable systems can also be used.

FIG. 1 shows a single document 102; it will be understood that system 100 can receive multiple documents 102, sequentially and/or in parallel. In some examples, system 100 can receive multiple checks over the course of a particular time frame, such as a day, and can automatically process the checks at the end of the time frame, such as once a day. If a desynchronization should occur, the desynchronization may last over the course of the day, or until the system is reset. Some of the techniques discussed below can help ensure the accuracy of the automatic processing, and can help prevent an image of a check from being sent to an incorrect customer or an incorrect bank.

Document 102 can have a magnetic ink recognition line 104, typically located in the same location from document to document. Magnetic ink recognition line 104 can include encoded data that corresponds to entities and quantities, such as an institution code, an account number, a check number, a check amount, and other suitable data. In some examples, the document 102 is a check, and the magnetic ink recognition line 104 is positioned along a bottom edge of the check.

An optical scanner 106 can be configured to capture a respective plurality of images 108 that include the magnetic ink recognition lines 104 from a corresponding ordered plurality of documents 102, such as checks. In some examples, optical scanner can capture images of the front and back of each document 102. In some examples, each image 108 can ultimately be sent to a respective server of the respective institution corresponding to an institution code. In some examples, the institution can make each image accessible by a respective account holder at the institution, such as through a website on the internet.

A processor 110 can perform optical character recognition on the images 108 to generate a corresponding ordered first plurality of data strings 112. In some examples, data strings 112 can include raw character data from the respective images 108, which can (ideally) match characters from the magnetic ink recognition line 104. The raw character data typically includes numerals and several well-defined control characters. In other examples, processor 110 can parse the raw character data to extract numerical values corresponding to entities and quantities, such as an institution code, an account number, a check number, a check amount, and optionally others.

A magnetic scanner 114 can be configured to read magnetic ink recognition lines 104 from the ordered plurality of documents 102, such as checks, and generate a corresponding ordered second plurality of data strings 116. In some examples, optical scanner 106 and magnetic scanner 114 are housed in a common housing, such as a housing of an automated teller machine. In some examples, optical scanner 106, magnetic scanner 114, and processor 110 are housed in a common housing, such as a housing of an automated teller machine. In other examples, optical scanner 106 and magnetic scanner 114 may be discrete devices positioned apart from one another.

Ideally, the first and second pluralities 112, 116 of data strings would contain identical information and would remain perfectly synchronized during operation. In practice, there may be small differences between the first and second pluralities. For example, a particular digit may be read by the magnetic scanner 114 but may be illegible to the optical scanner 106. In other examples, the magnetic scanner 114 or the optical scanner 106 may misread a digit, mistaking the proper digit for another digit. In some examples, the processor 110 can include software that can combine the magnetic and optical data to correct these misread digits automatically. As another, more problematic, example, a data string can be omitted or duplicated in one of the pluralities 112, 116, thereby leading to a desynchronization that can affect all subsequent data strings. The processor 110 can detect such desynchronizations, and can flag these desynchronizations in an error signal 118. In particular, the processor 110 can group each desynchronization into a single error signal 118, which can be advantageous. For example, if a desynchronization affects 37 data strings, the systems and methods discussed herein detect and group all 37 instances of mismatched data strings into a single error signal 118, rather than generating 37 separate error signals for the 37 mismatched data strings. This can reduce subsequent correction effort by a factor of 37, which is substantial.

FIGS. 2-6 show examples of some specific aspects of the operations performed by the processor 110 in identifying desynchronization between the pluralities of data strings. In the examples of FIGS. 2-6, the first plurality of data strings is produced through optical character recognition of images from the optical scanner, and the second plurality of data strings is produced from the magnetic scanner. In other examples, the first and second pluralities can be switched, so that the first plurality can include the magnetic data, and the second plurality can include the optical data.

Figure 2:
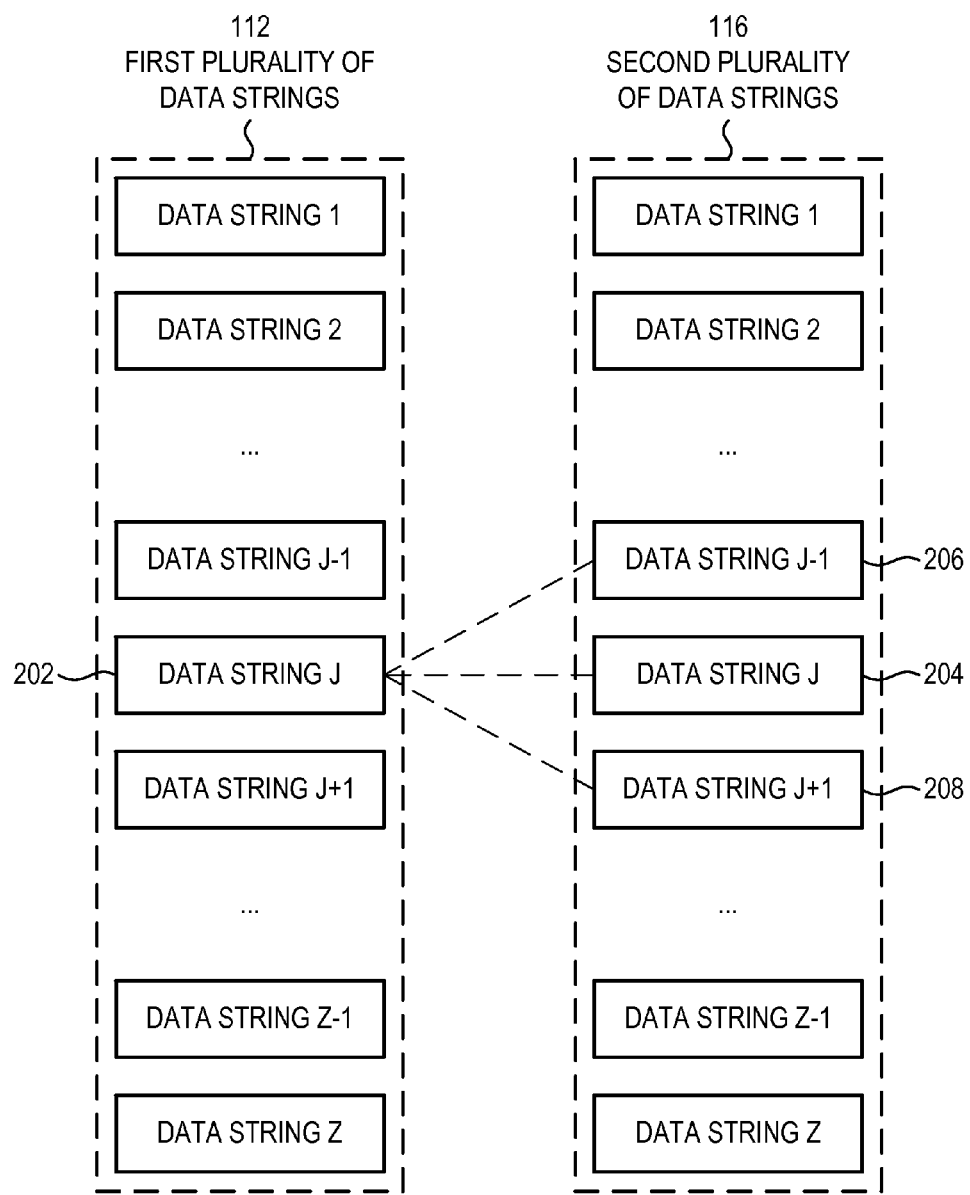
FIG. 2 shows an example of comparisons made by the processor in identifying desynchronization between the first plurality and the second plurality of data strings, in accordance with some embodiments.

FIG. 2 shows an example of comparisons made by the processor in identifying desynchronization between the first plurality 112 and the second plurality 116 of data strings, in accordance with some embodiments. The example of FIG. 2 is but one example, and other suitable comparisons can also be used.

In FIG. 2, processor 110 (FIG. 1) can compare each data string 202 in the first plurality 112 to the corresponding data string 204 in the second plurality 116 and to each data string sequentially before 206 or sequentially after 208 the corresponding data string 204 in the second plurality 116. Using the notation of FIG. 2, the first 112 and second 116 pluralities of data strings data strings can include Z data strings, and can be numbered from 1 to Z. Each data string in one of the pluralities can be compared to a corresponding data string in the other plurality, as well as sequentially adjacent data strings in the other plurality. Quantity J, which can be iterated from 1 to Z, can correspond to the number of a data string under consideration in the pluralities. In the example of FIG. 2, data string J 202 in the first plurality 112 can be compared to the corresponding data string J 204 in the second plurality 116, to data string J−1 206 sequentially before data string J 204, and to data string J+1 208 sequentially after data string J 204. Initial data string 1 of one plurality can be compared to data strings 1 and 2 in the other plurality. Final data string Z of one plurality can be compared to data strings Z−1 and Z in the other plurality.

The comparison shown by example in FIG. 2 can result in the processor 110 (FIG. 1) selecting of one of the three data strings 204, 206, 208 (or two, for the initial and final data strings) as most closely matching data string 202. Such a comparison can provide more information than merely determining whether or not data string J 202 in the first plurality 112 matches data string J 204 in the second plurality 116 (e.g., in a comparison scheme that does not look ahead or look behind).

In some examples, the processor 110 can use an edit distance as the basis for comparison. Suitable edit distances can include Levenshtein distance, longest common subsequence distance, Hamming distance, Jaro-Winkler distance, and others.

In some examples, the processor 110 can use Levenshtein distances as the basis for comparison. The Levenshtein distance between two strings is the minimum number of single-character edits (such as insertions, deletions or substitutions) required to change one string into the other. Levenshtein distances are well-known, as are implementations for calculating Levenshtein distances.

In some examples, such as the example shown in FIG. 2, the processor 110 can, for each data string 202 in the first plurality 112, calculate respective Levenshtein distances between said data string 202 in the first plurality 112 and the corresponding data string 204 in the second plurality 116, and between said first data string 202 in the first plurality 112 and each data string sequentially before 206 or sequentially after 208 the corresponding data string 204 in the second plurality 116.

In some examples, processor 110 can then select the lowest of the calculated Levenshtein distances. In some examples, processor 110 can select the data string of the second plurality corresponding to the selected Levenshtein distance. In some examples, processor 110 can designate the selected data string of the second plurality as matching said data string of the first plurality.

Figure 3:
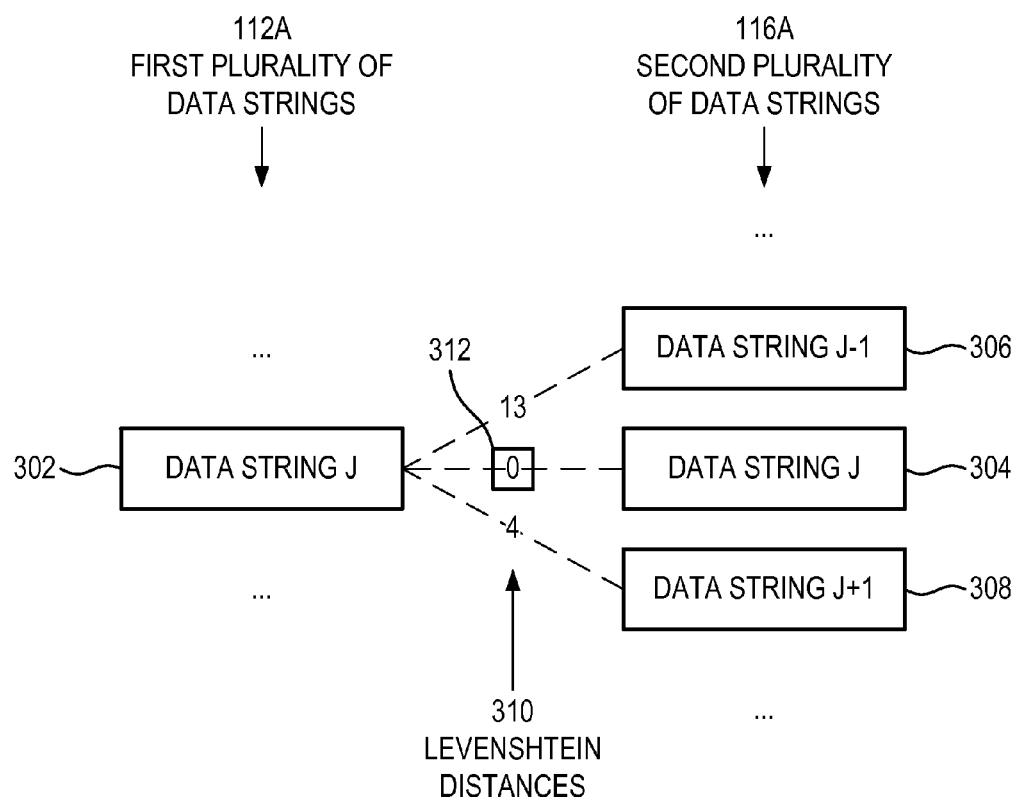
FIG. 3 shows an example in which data string J in the first plurality matches the corresponding data string J in the second plurality, and the processor designates data string as being synchronized to the second plurality, in accordance with some embodiments.
Figure 4:
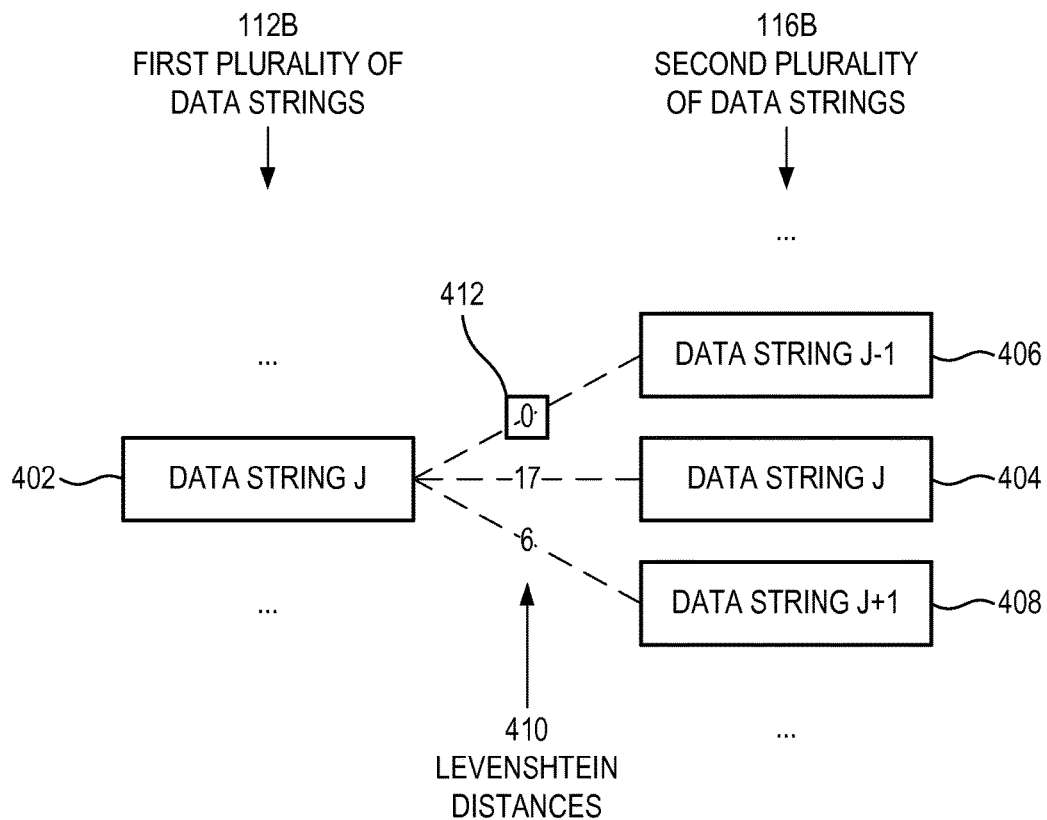
FIG. 4 shows an example in which data string J in the first plurality matches a data string J−1 sequentially before the corresponding data string J in the second plurality, and the processor designates data string as leading the second plurality, in accordance with some embodiments.
Figure 5:
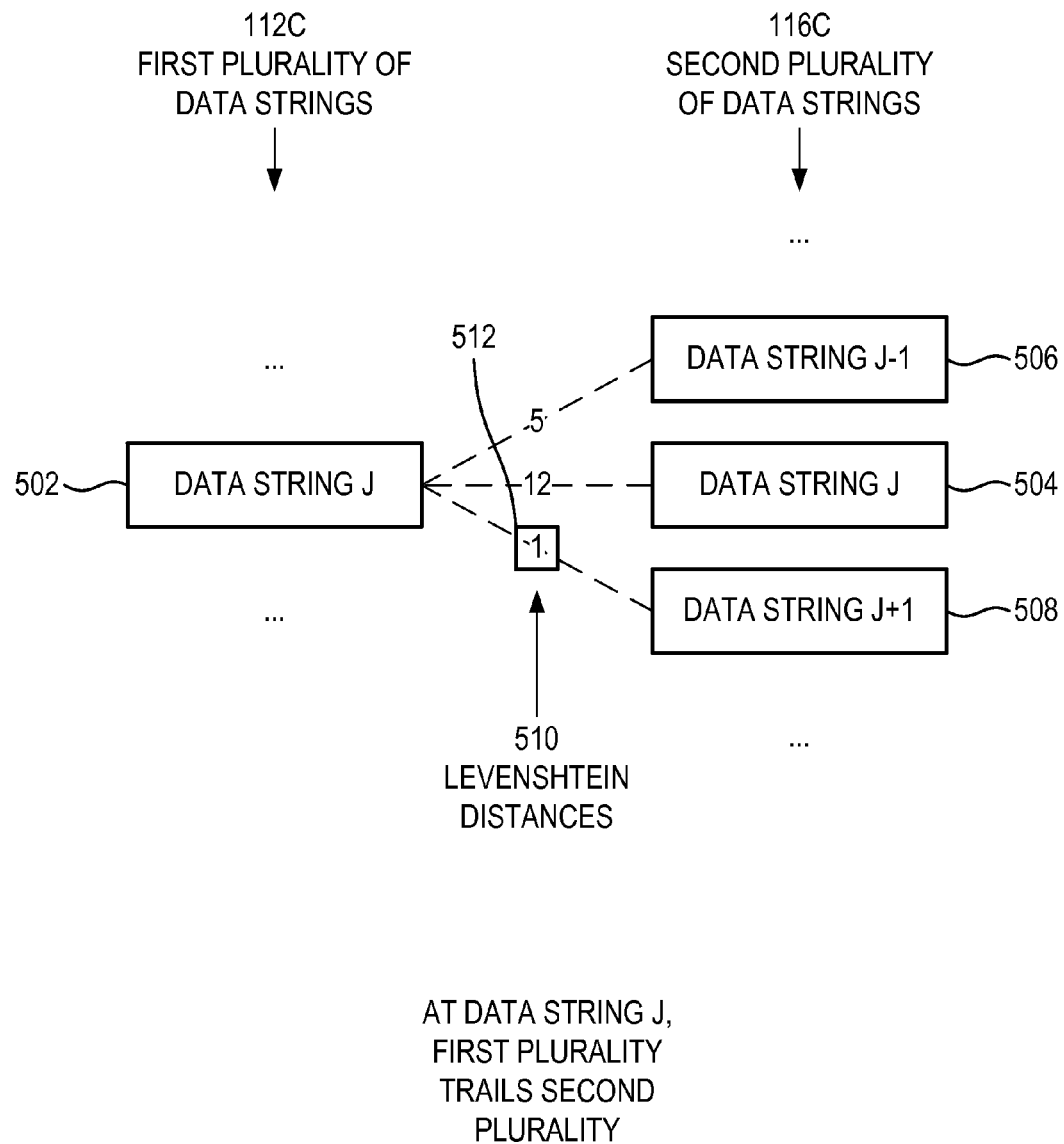
FIG. 5 shows an example in which data string J in the first plurality matches a data string J+1 sequentially after the corresponding data string J in the second plurality, and the processor designates data string as trailing the second plurality, in accordance with some embodiments.

Based on the comparison, such as the comparison shown by example in FIG. 2, processor 110 can designate each data string in the first plurality as being one of synchronized, leading, or trailing. FIGS. 3-5 show three examples of such a designation, using Levenshtein distances as the basis for comparison.

FIG. 3 shows an example in which data string J 302 in the first plurality 112A matches the corresponding data string J 304 in the second plurality 116A, and the processor 110 (FIG. 1) designates data string 302 as being synchronized to the second plurality 116A, in accordance with some embodiments.

In this example, processor 110 can calculate Levenshtein distances 310 between data strings 302 and 306, between data strings 302 and 304, and between data strings 302 and 308 as being 13, 0, and 4, respectively. Processor 110 can select the lowest of the calculated Levenshtein distances 310, namely 0 in this example. Processor 110 can select the data string of the second plurality 116A corresponding to the selected Levenshtein distance 312, namely data string 304 in this example. In some examples, processor 110 can designate the selected data string 304 of the second plurality 116A as matching said data string 302 of the first plurality 112A. Because data string J 302 in the first plurality 112A matches the corresponding data string J 304 in the second plurality 116A, processor 110 can designate data string J 302 as being synchronized to the second plurality 116A.

FIG. 4 shows an example in which data string J 402 in the first plurality 112B matches a data string J−1 406 sequentially before the corresponding data string J 404 in the second plurality 116B, and the processor 110 (FIG. 1) designates data string 402 as leading the second plurality 116B, in accordance with some embodiments.

In this example, processor 110 can calculate Levenshtein distances 410 between data strings 402 and 406, between data strings 402 and 404, and between data strings 402 and 408 as being 0, 17, and 6, respectively. Processor 110 can select the lowest of the calculated Levenshtein distances 410, namely 0 in this example. Processor 110 can select the data string of the second plurality 116B corresponding to the selected Levenshtein distance 412, namely data string 406 in this example. In some examples, processor 110 can designate the selected data string 406 of the second plurality 116B as matching said data string 402 of the first plurality 112B. Because data string J 402 in the first plurality 112B matches data string J−1 406 sequentially before the corresponding data string J 404 in the second plurality 116B, processor 110 can designate data string J 402 as leading the second plurality 116B.

FIG. 5 shows an example in which data string J 502 in the first plurality 112C matches a data string J+1 508 sequentially after the corresponding data string J 504 in the second plurality 116C, and the processor 110 (FIG. 1) designates data string 502 as trailing the second plurality 116C, in accordance with some embodiments.

In this example, processor 110 can calculate Levenshtein distances 510 between data strings 502 and 506, between data strings 502 and 504, and between data strings 502 and 508 as being 5, 12, and 1, respectively. Processor 110 can select the lowest of the calculated Levenshtein distances 510, namely 1 in this example. Processor 110 can select the data string of the second plurality 116C corresponding to the selected Levenshtein distance 512, namely data string 508 in this example. In some examples, processor 110 can designate the selected data string 508 of the second plurality 116C as matching said data string 502 of the first plurality 112C. Because data string J 502 in the first plurality 112C matches data string J+1 508 sequentially after the corresponding data string J 504 in the second plurality 116C, processor 110 can designate data string J 502 as leading trailing the second plurality 116C.

In these examples, a Levenshtein distance of 0 means that the respective data strings are identical. This is a desirable circumstance, because it shows complete agreement between data strings obtained optically and magnetically. In practice, there may be discrepancies between the data strings that can cause the Levenshtein distance to be non-zero. For instance, one of the characters can be smudged or illegible, and so forth. For instance, in the example of FIG. 5, the lowest Levenshtein distance is 1, which can be caused by an illegible character from the optical character recognition. For these cases, the match to data string 508, which is off by one character, is still better than the match to data string 504 or to data string 506, which include many more characters that do not match corresponding characters in data string 502. In this manner, the matching scheme can be quite robust, and can help ensure that an image of a document is not sent to the wrong institution or the wrong account holder.

Figure 6:
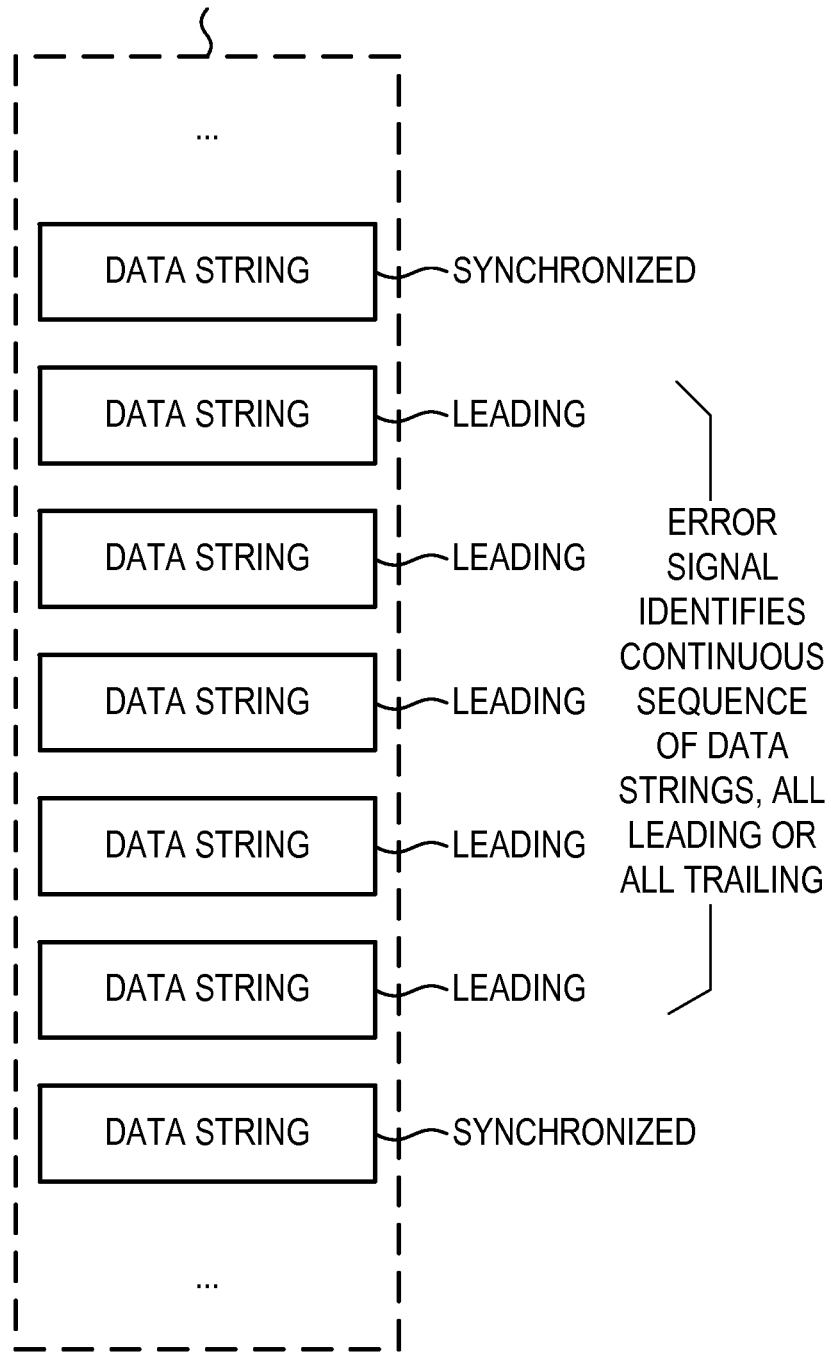
FIG. 6 shows an example in which a processor can identify a continuous sequence of N data strings in the first plurality that all have a designation of leading or all have a designation of trailing, where N equals or exceeds a specified sequence threshold, in accordance with some embodiments.

FIG. 6 shows an example in which a processor 110 can identify a continuous sequence of N data strings in the first plurality 112D that all have a designation of leading or all have a designation of trailing, where N equals or exceeds a specified sequence threshold, in accordance with some embodiments. In some examples, the specified sequence threshold can equal two, three, four, five, six, or more than six. In the specific example of FIG. 6, N equals five, and the specified sequence threshold equals three. Other suitable values can also be used.

Once the processor 110 identifies the continuous sequence of N data strings, the processor 110 can generate a single error signal 118 (FIG. 1) that identifies all N of the data strings in the continuous sequence as being desynchronized. The processor can optionally send the error signal 118 to a server, so that a human operator can manually synchronize the data strings in the continuous sequence, and ensure that the corresponding images are sent to the correct account holders.

In some examples, the processor 110 can identify more than one continuous sequence of data strings in the same plurality. For these examples, the processor 110 can generate an error signal for each sequence, or can generate a single error signal that includes multiple sequences.

There can be instances when it can be difficult to discern if two different data strings match each other, such as when the characters on a particular document may be too garbled to read optically. For these cases, the processor 110 (FIG. 1) can use a designation of unknown, to complement the designations of synchronized, leading, and trailing. For example, the processor 110 can designate the selected data string of the second plurality as being unknown if the lowest of the calculated Levenshtein distances equals or exceeds a specified Levenshtein distance threshold. Suitable specified Levenshtein distance thresholds can equal two, three, four, five, six, or more than six. In some examples, the processor 110 can allow continuous sequences of leading or trailing data strings to include one or more unknown data strings. For example, the processor can identify a continuous sequence of N data strings in the first plurality that all have a designation of leading or unknown, or all have a designation of trailing or unknown, where N equals or exceeds the specified sequence threshold. This is but one example of how the processor 110 can treat exceptions to the designations of synchronized, leading, and trailing; other examples can also be used.

Figure 7:
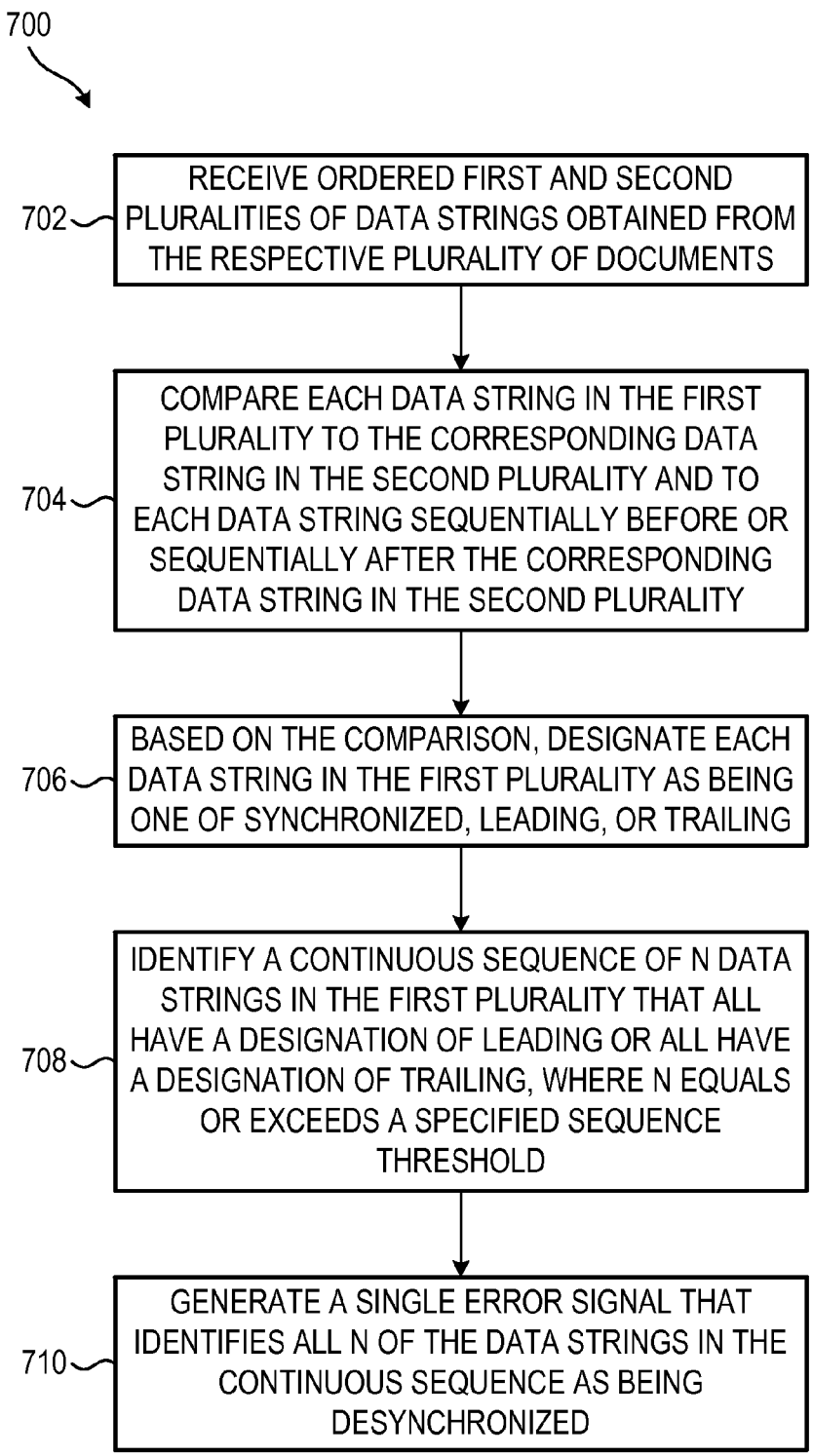
FIG. 7 shows an example of a method for identifying desynchronization between representations of data obtained from an ordered plurality of documents, in accordance with some embodiments.

FIG. 7 shows an example of a method 700 for identifying desynchronization between representations of data obtained from an ordered plurality of documents, in accordance with some embodiments. Method 700 can be executed on a system, such as 100 (FIG. 1) having a processor, such as 110 (FIG. 1). Method 700 is but one example of a method for identifying desynchronization between representations of data obtained from an ordered plurality of documents; other suitable methods can also be used.

At operation 702, the processor can receive ordered first and second pluralities of data strings obtained from the respective plurality of documents.

At operation 704, the processor can compare each data string in the first plurality to the corresponding data string in the second plurality and to each data string sequentially before or sequentially after the corresponding data string in the second plurality.

At operation 706, based on the comparison, the processor can designate each data string in the first plurality as being one of synchronized, leading, or trailing.

At operation 708, the processor can identify a continuous sequence of N data strings in the first plurality that all have a designation of leading or all have a designation of trailing, where N equals or exceeds a specified sequence threshold.

At operation 710, the processor can generate a single error signal that identifies all N of the data strings in the continuous sequence as being desynchronized.

In some examples, the processor can receive an ordered plurality of images of the respective ordered plurality of documents. In some examples, the processor can perform optical character recognition on the ordered plurality of images to generate the ordered first plurality of data strings. In some examples, the system can magnetically read a magnetic ink recognition line from each of the plurality of documents to generate the second plurality of data strings. In some examples, the system can image at least the magnetic ink recognition line from each of the plurality of documents to form the plurality of images.

Figure 8:
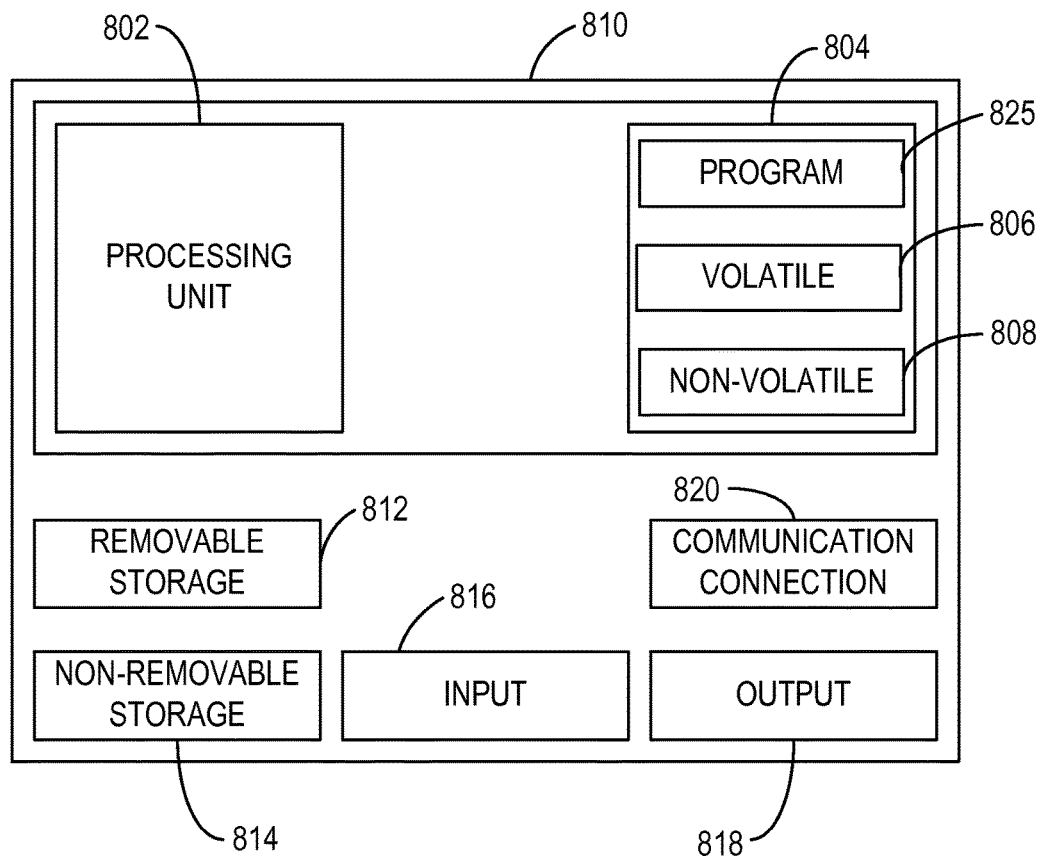
FIG. 8 is a block diagram of a computing device, according to an example embodiment.

FIG. 8 is a block diagram of a computing device, according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 810, may include a processing unit 802, memory 804, removable storage 812, and non-removable storage 814. Memory 804 may include volatile memory 806 and non-volatile memory 808. Computer 810 may include, or have access to a computing environment that includes, a variety of computer-readable media, such as volatile memory 806 and non-volatile memory 808, removable storage 812 and non-removable storage 814. Computer storage includes random access memory (RAM), read only memory (ROM), erasable programmable read-only memory (EPROM) and electrically erasable programmable read-only memory (EEPROM), flash memory or other memory technologies, compact disc read-only memory (CD-ROM), Digital Versatile Disks (DVD) or other optical disk storage, magnetic cassettes, magnetic tape, magnetic disk storage or other magnetic storage devices, or any other medium capable of storing computer-readable instructions. Computer 810 may include or have access to a computing environment that includes input 816, output 818, and a communication connection 820. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 802 of the computer 810. A hard drive, CD-ROM, and RAM are some examples of articles including a non-transitory computer-readable medium. For example, a computer program 825 capable of identifying desynchronization between representations of data obtained from an ordered plurality of documents according to the teachings of the present invention may be included on a CD-ROM and loaded from the CD-ROM to a hard drive. The computer-readable instructions allow computer 810 to provide generic access controls in a COM based computer network system having multiple users and servers.

What is claimed is:
1. A method, comprising:
receiving ordered first and second pluralities of data strings obtained from an ordered plurality of documents, the ordered first plurality of data strings obtained from an optical scanner, the ordered second plurality of data strings obtained from a magnetic scanner;
comparing each data string in the first plurality to a corresponding data string in the second plurality and to each data string sequentially before or sequentially after the corresponding data string in the second plurality;
based on the comparing, designating each data string in the first plurality as being one of unknown, synchronized, leading, or trailing;
when a continuous sequence of N data strings in the first plurality have a same designation as leading or trailing, generating an error signal associated with the first and second pluralities identifying all N of the data strings in the continuous sequence as being desynchronized; and
making only documents associated with data strings in the first plurality that are synchronized available for viewing.

2. The method of claim 1, further comprising:
   receiving an ordered plurality of images of the respective ordered plurality of documents; and
   performing optical character recognition on the ordered plurality of images to generate the ordered first plurality of data strings.

3. The method of claim 2, further comprising:
   magnetically reading a magnetic ink recognition line from each of the plurality of documents to generate the second plurality of data strings; and
   imaging at least the magnetic ink recognition line from each of the plurality of documents to form the plurality of images.

4. The method of claim 1, wherein designating each data string in the first plurality as being one of synchronized, leading, or trailing comprises:
   designating each data string in the first plurality as being one of:
   synchronized, when the data string in the first plurality matches the corresponding data string in the second plurality;
   leading, when the data string in the first plurality matches a data string sequentially before the corresponding data string in the second plurality; or
   trailing, when the data string in the first plurality matches a data string sequentially after the corresponding data string in the second plurality.

5. The method of claim 1, wherein comparing each data string in the first plurality to the corresponding data string in the second plurality and to each data string sequentially before or sequentially after the corresponding data string in the second plurality comprises:
   for each data string in the first plurality:
   calculating respective Levenshtein distances between said data string in the first plurality and the corresponding data string in the second plurality, and between said first data string in the first plurality and each data string sequentially before or sequentially after the corresponding data string in the second plurality;
   selecting the lowest of the calculated Levenshtein distances;
   selecting the data string of the second plurality corresponding to the selected Levenshtein distance; and
   designating the selected data string of the second plurality as matching said data string of the first plurality.

6. The method of claim 5, further comprising:
   designating the selected data string of the second plurality as being unknown if the lowest of the calculated Levenshtein distances equals or exceeds a specified Levenshtein distance threshold.

7. The method of claim 6, further comprising:
   identifying a continuous sequence of N data strings in the first plurality that all have a designation of leading or unknown, or all have a designation of trailing or unknown, where N equals or exceeds the specified sequence threshold.

8. The method of claim 1, wherein generating an error signal associated with the first and second pluralities identifying all N of the data strings in the continuous sequence as being desynchronized comprises:
   generating a single error signal associated with the first and second pluralities identifying all N of the data strings in the continuous sequence as being desynchronized.

9. The method of claim 1, wherein N equals or exceeds a specified sequence threshold.

10. A method, comprising:
    imaging each of an ordered plurality of documents to form a respective ordered plurality of images;
    performing optical character recognition on the ordered plurality of images to generate an ordered first plurality of data strings;
    magnetically reading a magnetic ink recognition line from each of the plurality of documents to generate an ordered second plurality of data strings;
    comparing each data string in the first plurality to a corresponding data string in the second plurality and to each data string sequentially before or sequentially after the corresponding data string in the second plurality;
    based on the comparing, designating each data string in the first plurality as being one of unknown, synchronized, leading, or trailing;
    when a continuous sequence of N data strings in the first plurality have a same designation as leading or trailing, generating an error signal associated with the first and second pluralities identifying all N of the data strings in the continuous sequence as being desynchronized, where N equals or exceeds a specified sequence threshold; and
    making only images associated with data strings in the first plurality that synchronized available for viewing.

11. The method of claim 10, wherein designating each data string in the first plurality as being one of synchronized, leading, or trailing comprises:
    designating each data string in the first plurality as being one of:
    synchronized, if the data string in the first plurality matches the corresponding data string in the second plurality;
    leading, if the data string in the first plurality matches a data string sequentially before the corresponding data string in the second plurality; or
    trailing, if the data string in the first plurality matches a data string sequentially after the corresponding data string in the second plurality.

12. The method of claim 10, wherein comparing each data string in the first plurality to the corresponding data string in the second plurality and to each data string sequentially before or sequentially after the corresponding data string in the second plurality comprises:
    for each data string in the first plurality:
    calculating respective Levenshtein distances between said data string in the first plurality and the corresponding data string in the second plurality, and between said first data string in the first plurality and each data string sequentially before or sequentially after the corresponding data string in the second plurality;
    selecting the lowest of the calculated Levenshtein distances;
    selecting the data string of the second plurality corresponding to the selected Levenshtein distance; and
    designating the selected data string of the second plurality as matching said data string of the first plurality.

13. The method of claim 12, further comprising:
    designating the selected data string of the second plurality as being unknown if the lowest of the calculated Levenshtein distances equals or exceeds a specified Levenshtein distance threshold.

14. The method of claim 13, further comprising:
identifying a continuous sequence of N data strings in the first plurality that all have a designation of leading or unknown, or all have a designation of trailing or unknown, where N equals or exceeds the specified sequence threshold.

15. The method of claim 10, wherein generating an error signal associated with the first and second pluralities identifying all N of the data strings in the continuous sequence as being desynchronized comprises:
generating a single error signal associated with the first and second pluralities identifying all N of the data strings in the continuous sequence as being desynchronized.

16. The method of claim 10, wherein the specified sequence threshold equals three (3).

17. A system, comprising:
an optical scanner configured to capture an ordered plurality of images from a respective ordered plurality of documents;
a processor configured to perform optical character recognition on the ordered plurality of images to generate a respective ordered first plurality of data strings; and
a magnetic scanner configured to magnetically read a magnetic ink recognition line from each of the plurality of documents to generate a respective ordered second plurality of data strings;
wherein the processor is further configured to:
compare each data string in the first plurality to the corresponding data string in the second plurality and to each data string sequentially before or sequentially after the corresponding data string in the second plurality;
based on the comparison, designate each data string in the first plurality as being one of unknown, synchronized, leading, or trailing;
identify a continuous sequence of N data strings in the first plurality that all have a designation of leading or all have a designation of trailing, where N equals or exceeds a specified sequence threshold;
generate a single error signal that identifies all N of the data strings in the continuous sequence as being desynchronized; and
making only images associated with data strings in the first plurality that synchronized available for viewing.

18. The system of claim 17, wherein the processor is further configured to:
designate each data string in the first plurality as being one of:
synchronized, if the data string in the first plurality matches the corresponding data string in the second plurality,
leading, if the data string in the first plurality matches a data string sequentially before the corresponding data string in the second plurality; or
trailing, if the data string in the first plurality matches a data string sequentially after the corresponding data string in the second plurality.

19. The system of claim 17, wherein the processor is further configured to:
for each data string in the first plurality:
calculate respective Levenshtein distances between said data string in the first plurality and the corresponding data string in the second plurality, and between said first data string in the first plurality and each data string sequentially before or sequentially after the corresponding data string in the second plurality;
select the lowest of the calculated Levenshtein distances;
select the data string of the second plurality corresponding to the selected Levenshtein distance; and
designate the selected data string of the second plurality as matching said data string of the first plurality.

20. The system of claim 19, wherein the processor is further configured to:
designate the selected data string of the second plurality as being unknown if the lowest of the calculated Levenshtein distances equals or exceeds a specified Levenshtein distance threshold; and
identify a continuous sequence of N data strings in the first plurality that all have a designation of leading or unknown, or all have a designation of trailing or unknown, where N equals or exceeds the specified sequence threshold.

* * * * *